US006375154B1

(12) United States Patent
Kussel et al.

(10) Patent No.: US 6,375,154 B1
(45) Date of Patent: Apr. 23, 2002

(54) SEAT AND HOLDING VALVE

(75) Inventors: Willy Kussel, Werne; Rolf Beils, Essen, both of (DE)

(73) Assignee: Tiefenbach Bergbautechnik GmbH, Essen (DE)

( * ) Notice: Subject to any disclaimer, the term of this patent is extended or adjusted under 35 U.S.C. 154(b) by 0 days.

(21) Appl. No.: 09/552,059

(22) Filed: Apr. 19, 2000

(30) Foreign Application Priority Data

Apr. 19, 1999 (DE) ........................................ 199 17 651

(51) Int. Cl.[7] ................................................ F16K 51/00
(52) U.S. Cl. ................... 251/210; 251/333; 137/625.26
(58) Field of Search ................................ 251/333, 210; 137/625.26

(56) References Cited

U.S. PATENT DOCUMENTS 2,358,950 A * 9/1944 Trautman .................. 251/333
2,460,867 A * 2/1949 Zimmerman ............ 251/333 X
2,634,754 A * 4/1953 Rahn ...................... 251/333 X
2,840,336 A * 6/1958 Suthann .................. 251/333 X
2,927,737 A * 3/1960 Zeuch et al. ............ 251/333 X
4,023,466 A * 5/1977 Strassheimer ........... 251/210 X
4,040,600 A * 8/1977 Coppola et al. ........ 251/333 X
4,529,165 A * 7/1985 Lehrach .................. 251/333 X
4,840,198 A * 6/1989 Ott ........................ 137/625.26
5,103,866 A * 4/1992 Foster .................... 251/210 X
5,375,813 A * 12/1994 Rozinsky .................... 251/333
5,388,613 A * 2/1995 Kruger ................... 251/333 X
5,950,989 A * 9/1999 Hajek, Jr. et al. ........... 251/333

* cited by examiner

*Primary Examiner*—Kevin Shaver
*Assistant Examiner*—John Bastianelli
(74) *Attorney, Agent, or Firm*—Alston & Bird LLP

(57) ABSTRACT

A hydraulic seat and holding valve for hydraulically controlling and holding a hydraulic load in a leakproof manner comprises a seat pairing, whose valve cone, which is part of the piston, is capable of adapting itself to the conical valve seat. To this end, the valve piston is supported for pivoting relative to the valve seat. The cone angles of the valve cone and the valve seat are different.

15 Claims, 2 Drawing Sheets

SEAT AND HOLDING VALVE

BACKGROUND OF THE INVENTION

The present invention relates to a seat and holding valve.

In water hydraulic engineering, it is very important for a holding valve to be leakproof in the holding operation. Leakages under high pressures of, for example, 300 bars lead to the destruction of the valve within few seconds.

For this reason, it is very important in water hydraulic engineering that a high accuracy be applied in the manufacture of the seat pairing of a valve. This means that the valve seat must be accurately adapted to the valve cone with the least tolerances. This includes not only consistency with respect to the cone angles, but also congruence with respect to the cone axes of the valve seat and the valve cone. While on the one hand this high precision in the manufacture is difficult to realize and difficult to reproduce, it is also very expensive on the other hand.

It is accordingly an object of the invention to provide an absolutely leakproof holding valve, which is largely independent of the manufacturing tolerance and can therefore be manufactured with a good reproducibility and at little cost, and which can operate free of wear and trouble, and yet be robust and reliable.

SUMMARY OF THE INVENTION

The present invention solves the above and other problems by providing an improved hydraulic seat and holding valve for hydraulically controlling and for holding a hydraulic load. The improved valve comprises a valve piston supported in a valve housing for pivoting relative to a generally conical valve seat of the valve housing. The valve housing at least partially defines a first chamber and a second chamber, and the valve seat is positioned between the first chamber and the second chamber. The valve piston comprises a generally conical circumference that can be characterized as a valve cone. The valve cone and the valve seat function together as a seat pairing for closing the first chamber relative the second chamber to hold the hydraulic load in a substantially leakproof manner. This development has the advantage that it results in a hydraulic load-dependent sealing, so that even a high load does not lead to leakage.

The valve preferably further comprises a valve shaft positioned in the valve housing. In accordance with a first embodiment of the present invention, the valve cone is mounted to the valve shaft for swinging movement relative to the valve shaft. In this case the means for mounting the valve cone to the valve shaft comprises an elastic seal positioned between the valve cone and the valve shaft.

In accordance with a second embodiment of the present invention, which is advantageously applicable to any type of seat valve, the valve piston is fixedly mounted to the valve shaft, to form an inflexible unit therewith, while the valve shaft has a lateral play at its guiding end, which is one of the ends opposite the valve cone, to permit pivoting of the unit in the valve housing.

In accordance with one version of the second embodiment, the guiding end of the valve shaft is sized so that there is lateral play between the guide end of the valve shaft and the valve housing, so that the valve shaft is adapted for pivoting in the valve housing. This development permits guiding the valve cone in a safe manner and handling high pressures, while simultaneously ensuring the pivotal capability of the valve cone, so that a uniform face pressure results in the seat pairing.

In accordance with another version of the second embodiment, the guiding end of valve shaft is guided in a guiding member preferably without lateral play while the guiding member is sized with respect to the valve housing to permit lateral play therebetween. This development permits guiding the valve cone in a safe manner and handling high pressures, while simultaneously ensuring the pivotal capability of the valve cone, so that a uniform face pressure results in the seat pairing.

The valves of the various embodiments of the present invention are useful, for example, when they are under a high hydraulic load, which must be kept leakproof. This load can act upon a cylinder-piston unit, for example, from the outside, but can also be exerted by a pump, which connects to a plurality of consumers, so that the valve has to hold a continuous load.

In accordance with one aspect of the present invention, the cone angle of the valve seat and the cone angle of the valve cone are made different. Preferably, the difference is from approximately 2.5° to 8°. This results in a circular line contact, which leads to a high face pressure, so that the valve cone and valve seat optimally adapt to each other.

Preferably, the cone angle of the valve cone is smaller than the cone angle of the valve seat.

Other aspects of the present invention further provide degrees of freedom of the valve shaft that facilitate desired pivotal movement of the valve shaft.

In accordance with another aspect of the present invention, the valve is a combination of a holding valve and a control valve.

BRIEF DESCRIPTION OF THE DRAWINGS

In the following, an embodiment of the invention is described in greater detail with reference to the drawings, in which.

DETAILED DESCRIPTION OF AN EMBODIMENT

Figure 1:
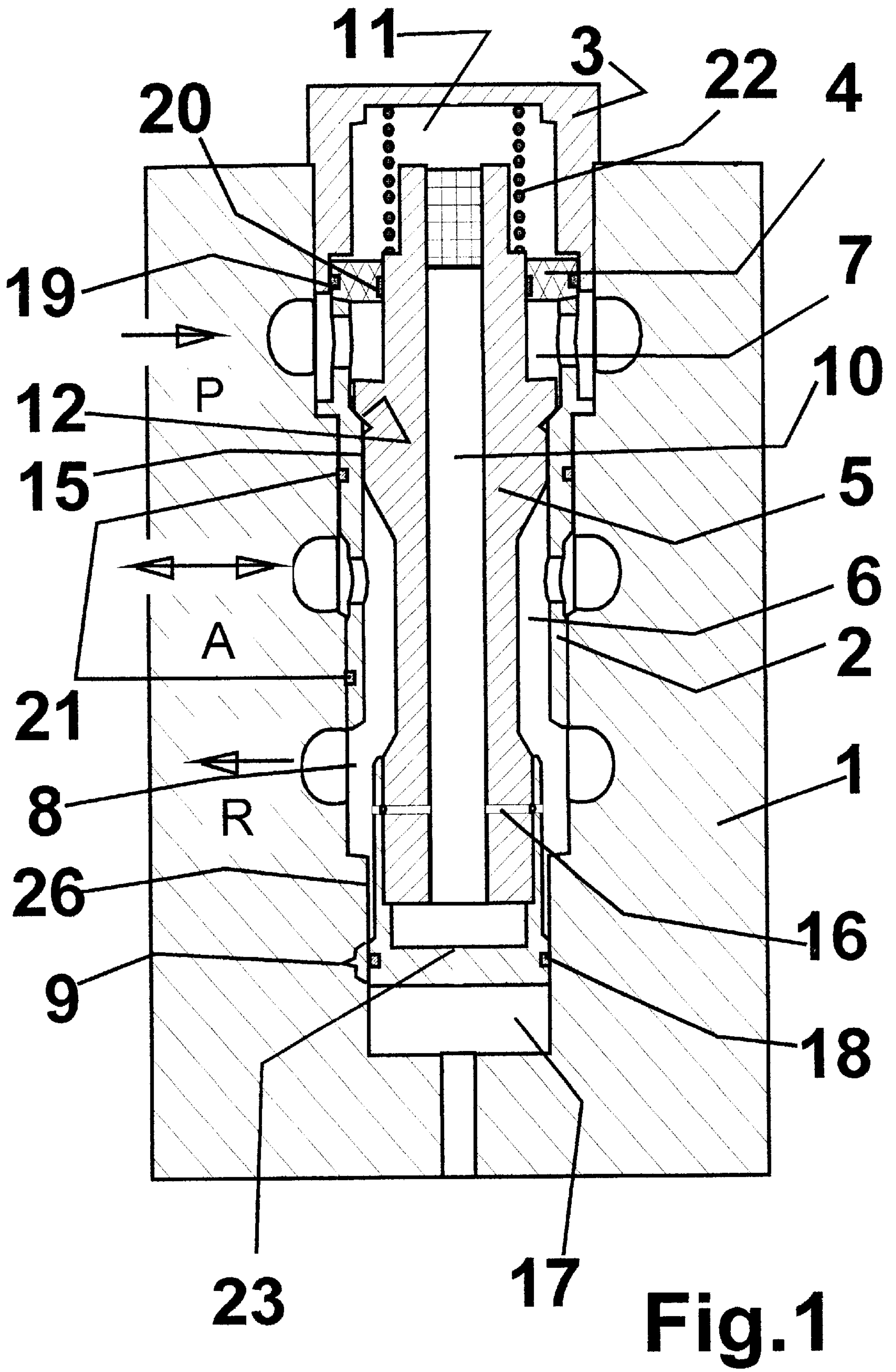
FIG. 1 is a sectional view of a holding and seat valve.

An embodiment of the holding and seat valve according to the invention is used for holding in a leakproof manner a consumer not shown, for example, a hydraulic cylinder-piston unit, which is under a load, i.e. a high pressure, as well as for hydraulically controlling and lowering the piston. An outer casing 1 supports a valve housing 2, which is sealed by gaskets 21. To this end, an end cap 3 closes the center chamber of the outer casing 1. In the valve housing 2, a valve shaft 5 is aligned at its one end in a guide member 4. Relative to the valve housing, the valve shaft 5 forms: between the end cap 3 and the guide member 4, an equalization chamber 11; between the guide member 4 and a seat pairing 12, a pump connection chamber 7; between the seat pairing 12 and its guide end 9 facing away from the equalization chamber 11, a consumer connection chamber 6; between a return flow collar 26 and the guide end 9, a return flow chamber 8; and between the front face of the guide end 9 and the end chamber of the outer casing, a control chamber 17.

The return flow chamber 8 connects to the equalization chamber 11 via an equalizing channel 10 and a radial equalizing channel 16. Consequently, the equalization chamber 11 is relieved from pressure.

The guide end 9 of the valve shaft is formed by an end cap 23, which is screwed to the respective end of the valve shaft.

The length of the guide end 9 is relatively small. The diameter of the guide end 9 is smaller than the inside diameter of the valve housing in the longitudinal region, in which the guide end 9 extends. A clearance is bridged by an elastic seal (pivot seal) 18. With that, the end cap 23 forms in the outer casing the control chamber 17 at the end of the valve housing. The chambers of the valve connect: via pump connection P to a pump; via consumer connection A to a consumer; via return flow connection R to a reservoir; and via a control channel to a control pressure sensor.

For controlling, i.e., connecting and closing the pump connection chamber 7 relative to the consumer connection chamber 6, the valve shaft 5 is provided with a circular-cylindrical collar 15 as well as a seat pairing 12 for a leakproof closing of the pump connection chamber 7.

Figure 2:
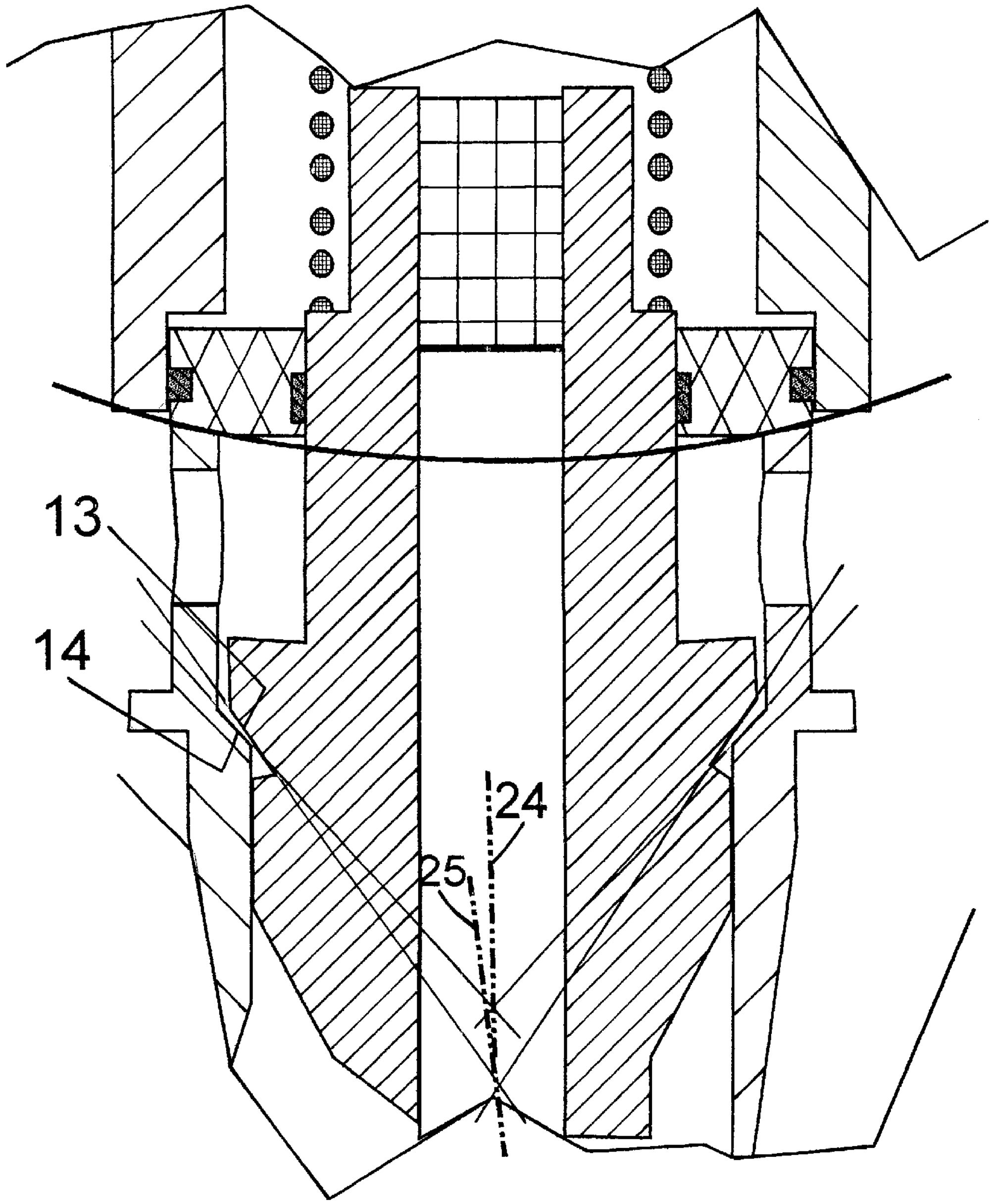
FIG. 2 is an enlarged sectional view of a portion of the holding and seat valve of FIG. 1.

As shown in the enlarged view of FIG. 2, the seat pairing 12 comprises a valve cone 13 in the form of a truncated cone and a conical seat surface (valve seat) 14. With its smaller sectional plane, the valve cone 13 corresponds to the cylinder surface of the control collar 15. The conical jacket of the seat connects the inner circumference of the pump connection chamber 7 to the inner circumference of the consumer connection chamber 6.

The angle of cone of the valve seat 14 is slightly greater, preferably between 2° and 8°, than the angle of cone of the valve cone 13, whereby a circular contact results initially between the valve seat 14 and the valve cone 13. This has the advantage that despite inaccuracies in manufacturing and alignment errors of the cone axes 24 of the valve seat and 25 of the valve cone, the seat surfaces of the valve seat and the valve cone work into each other, so as to result in an accurate fit and seal. The pivoting center of the valve piston is close to or on the cone axis 24 of the valve seat and preferably on the same side of the valve seat as the apexes of the cones.

At its end facing away from the guide end 9, the valve shaft is aligned with a guide member 4. Relative to the inner circumference of the end cap 3, the outer circumference of the guide member exhibits a slight play. This play is bridged by a gasket 19 for purposes of sealing the pump connection chamber 7 against the equalization chamber 11 by means of a seal 19. The inner circumference of the guide member 4 is also fitted with a seal 20. Furthermore, on its side facing away from the equalization chamber 11, the guide member 4 is made slightly spherical, as shown in the enlarged view of FIG. 2. The front face of the valve housing, which is constructed as a taper sleeve, comprises a corresponding spherical indentation, in which the guide member 4 is accommodated and allowed to pivot.

Furthermore, the cylinder jacket of control collar 15 exhibits a slight play relative the inner jacket of the valve housing. This allows the valve shaft to pivot about its guide end, and the valve cone to adapt itself to the seat cone. The cone axes are capable of aligning, so that for breaking in, a precise and uniform circular contact occurs between the valve cone and the seat cone.

The seat pairing is closed by loading the valve shaft with a spring 22, which is arranged in the equalization chamber 11, and acts upon the end of the valve shaft, which extends into the equalization chamber 11. The seat pairing is opened by applying pressure to the control chamber 17 at the other end of the valve shaft 5. At the same time, such an opening action causes the consumer connection chamber 6 to be closed relative to the return flow chamber 8, because the return flow collar 26 of the end cap 23 engages the inner circumference of the valve housing between the consumer connection chamber and the return flow chamber 8.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A hydraulic seat and holding valve for hydraulically controlling and for holding a hydraulic load, the valve comprising:

a valve housing at least partially defining a first chamber and a second chamber, and comprising a generally conical valve seat positioned between the first chamber and the second chamber;

a valve piston which is positioned in the valve housing and has a generally conical circumference, with the conical circumference of the valve piston and the valve seat functioning together as a seat pairing for closing the first chamber relative the second chamber to hold the hydraulic load in a substantially leakproof manner;

a valve shaft that is positioned in the valve housing, supported for pivoting relative to the valve seat, and mounted to the valve piston to form a substantially inflexible unit;

a seal that sealably supports a first end of the valve shaft; and a guide member in which a second end of the valve shaft is aligned, wherein the guide member is sized so that there is lateral play between the guide member and the valve housing, and wherein the valve shaft is sized so that there is lateral play between the first end of the valve shaft and the valve housing, and so that there is lateral play between the second end of the valve shaft and the valve housing, so that the valve shaft is adapted for pivoting in the valve housing.

2. The valve of claim 1, wherein the cone angle of the valve seat and the cone angle of the conical circumference are different.

3. The valve of claim 2, wherein the difference between the cone angle of the valve seat and the cone angle of the conical circumference of the valve piston is between approximately 2.5° and 8°.

4. The valve of claim 1, further comprising a spring that urges the valve shaft to move in a longitudinal direction.

5. The valve of claim 4, wherein the guide member is positioned between the spring and the seat pairing.

6. The valve of claim 1, wherein:

longitudinal movement of the valve shaft in a first direction causes the seat pairing to open the first chamber relative to the second chamber, and also causes structure of the valve shaft to engage an inner circumference of the valve housing and thereby close a passageway between the second chamber and a third chamber, wherein the third chamber is at least partially defined by the valve housing, and said structure of the valve shaft is longitudinally distant from the valve piston; and longitudinal movement of the valve shaft in a second direction causes the seat pairing to close the first chamber relative the second chamber, and also causes said structure of the valve shaft to move relative to the inner circumference of the valve housing and thereby open said passageway between the second chamber and the third chamber.

7. The valve of claim 6, wherein said structure of the valve shaft includes a collar mounted to the valve shaft.

8. The valve of claim 1, further comprising a spherical cup within which the guide member is supported relative to the valve housing.

9. The valve of claim 8, wherein the spherical cup is a portion of the valve housing that defines an at least partially spherical indentation which is in receipt of an at least partially spherical surface of the guide member.

10. The valve of claim 1, wherein a portion of the valve housing defines an at least partially spherical indentation which is in receipt of an at least partially spherical surface of the guide member.

11. A hydraulic seat and holding valve for hydraulically controlling and for holding a hydraulic load, the valve comprising:

a valve housing at least partially defining a first chamber and a second chamber, and comprising a generally conical valve seat positioned between the first chamber and the second chamber;

a valve piston positioned in the valve housing and supported for pivoting relative to the valve seat, wherein the valve piston comprises a generally conical circumference, and the conical circumference of the valve piston and the valve seat function together as a seat pairing for closing the first chamber relative the second chamber to hold the hydraulic load in a substantially leakproof manner;

a valve shaft positioned in the valve housing and adapted for pivoting in and relative to the valve housing, wherein the valve piston is fixedly mounted to the valve shaft to form an inflexible unit, and the valve shaft has opposite first and second ends;

a seal sealably supporting the first end of the valve shaft, wherein the valve shaft is sized so that there is lateral play between the first end of the valve shaft and the valve housing, so that there is lateral play between the second end of the valve shaft and the valve housing, and so that the valve shaft is adapted for pivoting in the valve housing; and a guide member in which the second end of the valve shaft is aligned, wherein the guide member is sized so there is lateral play between the guide member and the valve housing.

12. The valve of claim 11, further comprising a spherical cup within which the guide member is supported relative to the valve housing.

13. A hydraulic seat and holding valve for hydraulically controlling and for holding a hydraulic load, the valve comprising:

a valve housing at least partially defining a pump connection chamber, a consumer connection chamber, and a return flow chamber, and comprising a generally conical valve seat positioned between the pump connection chamber and the consumer connection chamber;

a valve piston positioned in the valve housing and supported for pivoting relative to the valve seat, wherein the valve piston comprises a generally conical circumference, and the conical circumference of the valve piston and the valve seat function together as a seat pairing for closing the pump connection chamber relative to the consumer connection chamber to hold the hydraulic load in a substantially leakproof manner, and wherein the cone angle of the valve seat and the cone angle of the conical circumference are different, with the difference being between approximately 2.5° and 8°;

a valve shaft positioned in the valve housing and adapted for pivoting in and relative to the valve housing, wherein the valve piston is fixedly mounted to the valve shaft to form an inflexible unit, and the valve shaft has opposite first and second ends;

a seal sealably supporting the first end of the valve shaft, wherein the first end of the valve shaft is sized so that there is lateral play between the first end of the valve shaft and the valve housing;

a return flow collar mounted to the valve shaft for moving longitudinally with the valve piston, so that the return flow collar closes a connection between the return flow chamber and the consumer connection chamber by engaging an inner circumference of the valve housing, wherein the first end of the valve shaft is adjacent the return flow collar, and wherein a control chamber, which is for at least partially controlling the longitudinal movement of the valve shaft, is at least partially defined between the first end of the valve shaft and a first end of the valve housing;

a guide member in which the second end of the valve shaft is aligned, wherein there is lateral play between the guide member and the valve housing and thereby there is lateral play between the second end of the valve shaft and the valve housing, so that the valve shaft is adapted for pivoting in the valve housing, whereby the valve piston is supported for pivoting relative to the valve seat, and wherein an equalization chamber is formed at least partially between the guide member and a second end of the valve housing, and the equalization chamber is connected to the return flow chamber; and a spherical cup within which the guide member is supported relative to the valve housing.

14. The valve of claim 1, wherein the cone angle of the conical circumference of the valve piston is smaller than the cone angle of the valve seat.

15. The valve of claim 1, wherein the valve is operative as a 3/2-way valve.

* * * * *

UNITED STATES PATENT AND TRADEMARK OFFICE

CERTIFICATE OF CORRECTION

PATENT NO. : 6,375,154 B1
DATED : April 23, 2002
INVENTOR(S) : Kussel et al.

It is certified that error appears in the above-identified patent and that said Letters Patent is hereby corrected as shown below:

Column 6,
Line 51, "claim 1" should read -- claim 13 --;
Line 54, "claim 1" should read -- claim 13 --.

Signed and Sealed this

Twenty-fourth Day of September, 2002

*Attest:*

JAMES E. ROGAN

*Attesting Officer*

*Director of the United States Patent and Trademark Office*